United States Patent
Xie et al.

(10) Patent No.: US 8,017,188 B2
(45) Date of Patent: Sep. 13, 2011

(54) METHODS OF MAKING ARTICLES HAVING TOUGHENED AND UNTOUGHENED REGIONS

(75) Inventors: Ming Xie, Beavercreek, OH (US); Donald George Lachapelle, Cincinnati, OH (US); Stephen Craig Mitchell, West Chester, OH (US)

(73) Assignee: General Electric Company, Schenectady, NY (US)

( * ) Notice: Subject to any disclaimer, the term of this patent is extended or adjusted under 35 U.S.C. 154(b) by 1154 days.

(21) Appl. No.: 11/830,874

(22) Filed: Jul. 31, 2007

(65) Prior Publication Data
US 2010/0148396 A1   Jun. 17, 2010

Related U.S. Application Data

(63) Continuation-in-part of application No. 11/736,319, filed on Apr. 17, 2007, now abandoned.

(51) Int. Cl.
*B05D 3/00* (2006.01)
(52) U.S. Cl. ............... 427/384; 427/385.5; 427/402; 427/407.1; 427/407.2; 427/407.3; 427/421.1; 427/427.4; 427/427.6; 427/427.7
(58) Field of Classification Search .............. None
See application file for complete search history.

(56) References Cited

U.S. PATENT DOCUMENTS

| 5,135,993 A | 8/1992 | Decker et al. |
|---|---|---|
| 7,390,161 B2 | 6/2008 | Xie et al. |
| 7,713,021 B2 | 5/2010 | Finn et al. |
| 2004/0041128 A1 | 3/2004 | Carter et al. |
| 2004/0146393 A1* | 7/2004 | Evans et al. ............ 415/9 |
| 2006/0134251 A1 | 6/2006 | Blanton et al. |
| 2008/0305340 A1* | 12/2008 | Fang et al. ............ 428/411.1 |
| 2010/0150706 A1 | 6/2010 | Xie et al. |

OTHER PUBLICATIONS

PCT International Search Report, dated Mar. 3, 2008.

* cited by examiner

*Primary Examiner* — Erma Cameron
(74) *Attorney, Agent, or Firm* — General Electric Company; Marcella R. Louke; William Scott Andes

(57) ABSTRACT

Methods of making an article having at least one toughened region and at least one untoughened region involving providing a material, applying a toughening agent to a portion of the material, shaping the material to produce a preform, applying an untoughened resin to the preform, and curing the preform having the applied untoughened resin to produce the at least one toughened region and the at least one untoughened region wherein the toughened region comprises a toughened resin having a fracture toughness of at least about 1.0 MPa-m$^{1/2}$.

17 Claims, 5 Drawing Sheets

METHODS OF MAKING ARTICLES HAVING TOUGHENED AND UNTOUGHENED REGIONS

CROSS REFERENCE TO RELATED APPLICATIONS

This is a Continuation-in-Part of application Ser. No. 11/736,319, filed Apr. 17, 2007, now abandoned which is herein incorporated by reference in its entirety.

TECHNICAL FIELD

Embodiments described herein generally relate to methods of making articles having toughened and untoughened regions. More particularly, embodiments herein generally describe methods of making articles from composite materials having toughened and untoughened regions.

BACKGROUND OF THE INVENTION

In gas turbine engines, such as aircraft engines, air is drawn into the front of the engine, compressed by a shaft-mounted compressor, and mixed with fuel in a combustor. The mixture is then burned and the hot exhaust gases are passed through a turbine mounted on the same shaft. The flow of combustion gas expands through the turbine, which in turn spins the shaft and provides power to the compressor. The hot exhaust gases are further expanded through nozzles at the back of the engine, generating powerful thrust, which drives the aircraft forward.

Because engines operate in a variety of conditions, foreign objects may sometimes undesirably enter the engine. More specifically, foreign objects, such as large birds, hailstones, sand and rain may be entrained in the inlet of the engine. As a result, these foreign objects may impact a fan blade and cause a portion of the impacted blade to be torn loose from the rotor, which is commonly known as fan blade out. The loose fan blade may then impact the interior of the fan casing at an impact zone, thereby causing a portion of the casing to bulge or deflect. This deformation of the casing may result in increased stresses along the entire circumference of the fan casing.

In recent years composite materials have become increasingly popular for use in a variety of aerospace applications because of their durability and relative light weight. Although composite materials can provide superior strength and weight properties, and can lessen the extent of damage to the fan casing during impacts such as blade outs, improvements can still be made.

Current containment technology, such as that used to manufacture fan casings, generally requires the use of a thicker casing design at high stress regions. More specifically, current fan casings are often made using a thick, monolithic hardwall design, which can help fragmentize a released fan blade and minimize the extent of damage. The energy generated by a released fan blade impacting a hardwall fan casing can be dissipated by any of several controlled failure mechanisms including resin microcracking, composite material ply delamination, and composite material ply failure.

All of the previously described energy dissipation mechanisms require the use of an untoughened resin to ensure controlled failure of the fan casing upon impact of the released fan blade. More particularly, an untoughened epoxy resin can be applied uniformly to the entire fan casing during resin application. After curing, the resulting composite material will have the previously described controlled failure mechanisms. However, areas away from impact zones, or non-impact zones, need to be stronger in order to maintain the integrity of the casing should an impact occur. Therefore, additional layers of untoughened composite material are often applied in non-impact zones in order to provide strength and toughness, as well as compensate for the lower strength of the untoughened material. These additional layers add undesired weight to the fan casing.

Accordingly, there remains a need for methods for manufacturing articles that can provide increased strength to the article in desired regions without increasing the overall weight of the article.

BRIEF DESCRIPTION OF THE INVENTION

Embodiments herein generally relate to methods of making an article having at least one toughened region and at least one untoughened region comprising providing a material, applying a toughening agent to a portion of the material, shaping the material to produce a preform, applying an untoughened resin to the preform, and curing the preform having the applied untoughened resin to produce the at least one toughened region and the at least one untoughened region wherein the toughened region comprises a toughened resin having a fracture toughness of at least about 1.0 MPa-m$^{1/2}$.

Embodiments herein also generally relate to methods of making an article having at least one toughened region and at least one untoughened region comprising providing a material, applying a toughening agent to a portion of the material, shaping the material to produce a preform, applying an untoughened resin to the preform, and curing the preform having the applied untoughened resin to produce the at least one toughened region and the at least one untoughened region wherein the toughened region corresponds to the portion of the material comprising the toughening agent, the composite material comprises a transition region between each toughened region and untoughened region, and the toughened region comprises a toughened resin having a fracture toughness of at least about 1.0 MPa-m$^{1/2}$.

Embodiments herein also generally relate to method of making a fan casing having at least one toughened region and at least one untoughened region comprising providing a material, applying a toughening agent to a portion of the material, shaping the material to produce a fan casing preform, applying an untoughened resin to the fan casing preform, and curing the fan casing preform having the applied untoughened resin to produce the at least one toughened region and the at least one untoughened region wherein the toughened region corresponds to the portion of the material comprising the toughening agent and wherein the toughened region comprises a toughened resin having a fracture toughness of at least about 1.0 MPa-m$^{1/2}$.

These and other features, aspects and advantages will become evident to those skilled in the art from the following disclosure.

BRIEF DESCRIPTION OF THE DRAWINGS

While the specification concludes with claims particularly pointing out and distinctly claiming the invention, it is believed that the embodiments set forth herein will be better understood from the following description in conjunction with the accompanying figures, in which like reference numerals identify like elements.

DETAILED DESCRIPTION OF THE INVENTION

Embodiments described herein generally relate to methods for making articles having at least one toughened region and at least one untoughened region. Generally, such methods can comprise providing a material, applying a toughening agent to a portion of the material, shaping the material to produce a preform, applying an untoughened resin to the preform, and curing the preform having the applied untoughened resin wherein the toughened region corresponds to the portion of the material comprising the toughening agent. While embodiments herein may generally focus on methods for making composite fan casings for gas turbine engines, it will be understood by those skilled in the art that the description should not be limited to such. Indeed, as the following description explains, the methods described herein may be used to make any article or composite material having at least one toughened region and at least one untoughened region.

Figure 1:
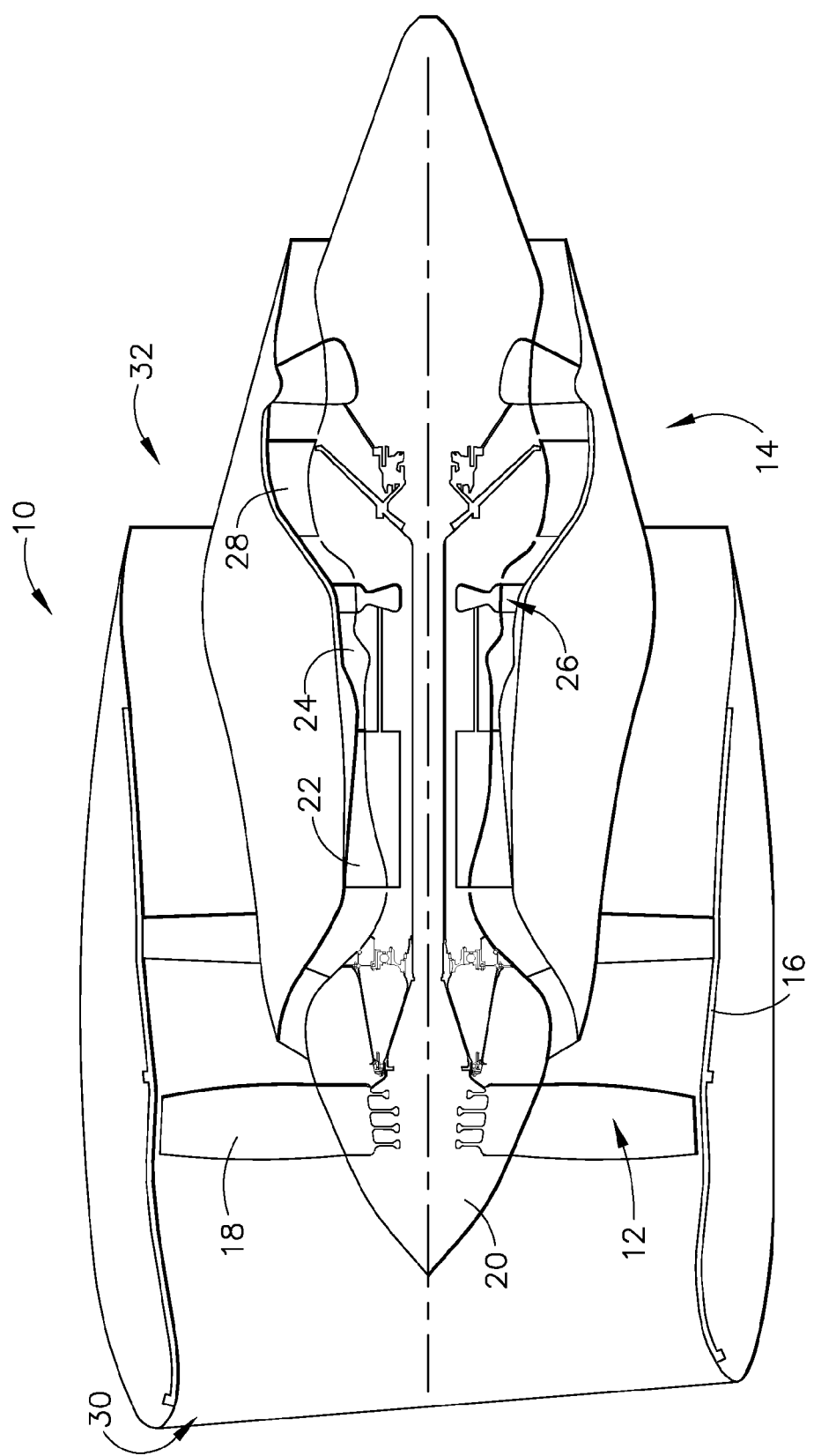
FIG. 1 is a schematic cut away view of one embodiment of a gas turbine engine in accordance with the description herein.

Turning to the figures, FIG. 1 is a schematic representation of one embodiment of a gas turbine engine 10 that generally includes a fan assembly 12 and a core engine 14. Fan assembly 12 may include a fan casing 16 and an array of fan blades 18 extending radially outwardly from a rotor disc 20. Core engine 14 may include a high-pressure compressor 22, a combustor 24, a high-pressure turbine 26 and a low-pressure turbine 28. Engine 10 has an intake end 30 and an exhaust end 32.

Figure 2:
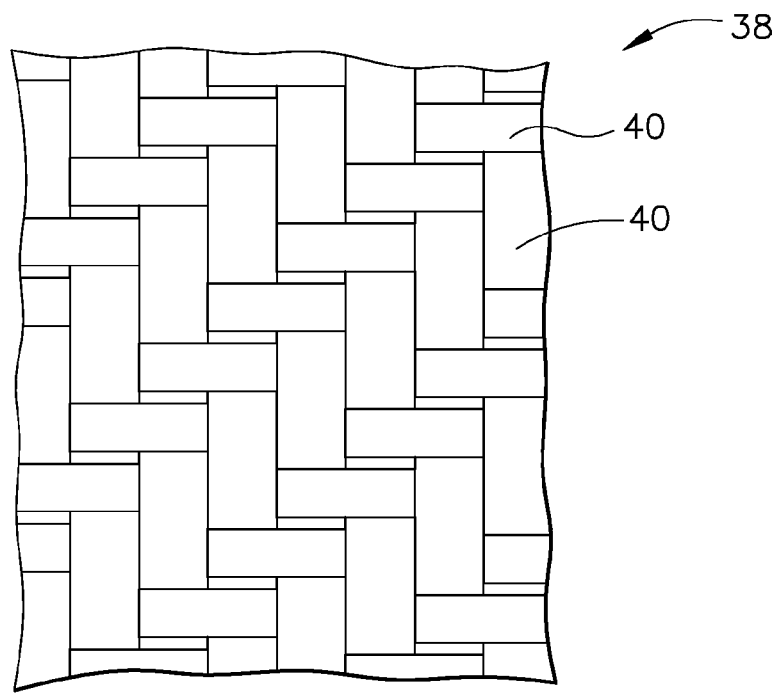
FIG. 2 is a schematic view of one embodiment of a material in accordance with the description herein.

Initially, to make the composite materials and articles described herein, a material 38 may be provided as shown in FIG. 2. Any traditional fabric or multiaxial non-crimp fabric capable of being combined with a resin to produce a composite material is acceptable for use herein as material 38. In one embodiment, material 38 may be a fiber fabric selected from the group consisting of carbon fiber, glass fiber, ceramic fiber, graphite fiber, aramid fiber, and combinations thereof. As shown in FIG. 2, material 38 may generally comprise multiple interwoven fiber tows 40.

Once material 38 is selected, a toughening agent 42 may be applied to a portion thereof. Toughening agent 42 may comprise anything capable of providing increased toughness to the finished composite material as compared to the toughness present in the composite material without the application of a toughening agent as described herein below. In one embodiment, toughening agent 42 may be selected from the group consisting of polymers, nano fibers, nano particles, and combinations thereof, though it should not be limited to such.

Figure 3:
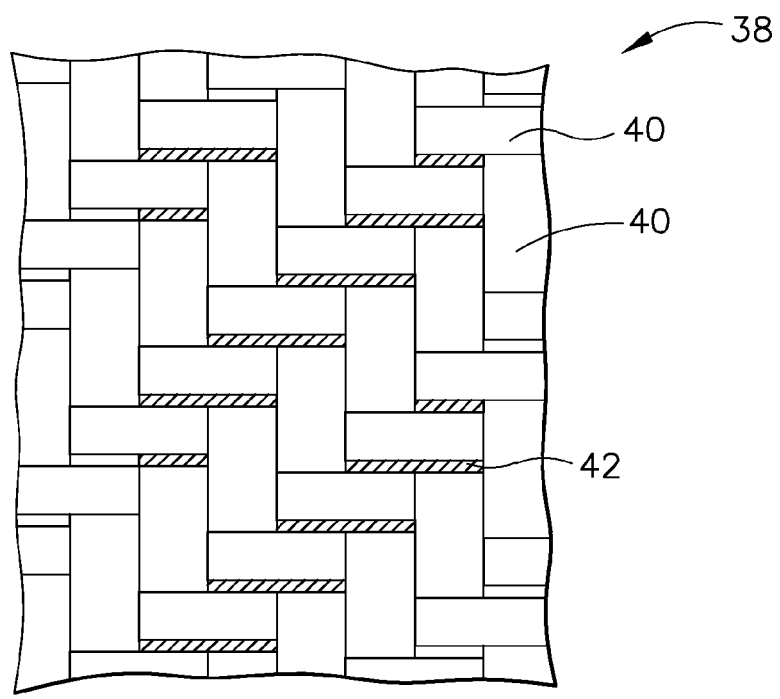
FIG. 3 is a schematic view of one embodiment of a material having a toughening agent applied thereto in accordance with the description herein.
Figure 4:
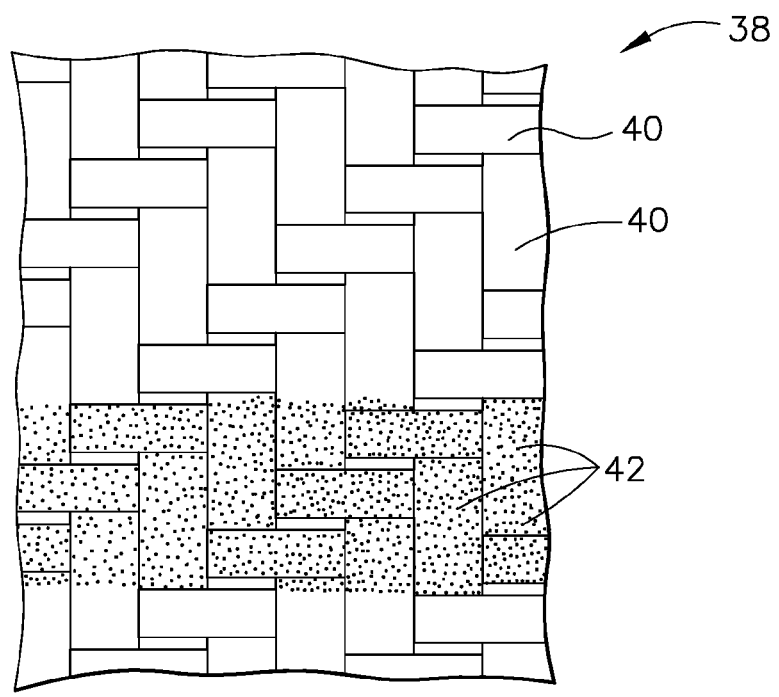
FIG. 4 is a schematic view of an alternate embodiment of a material having a toughening agent applied thereto in accordance with the description herein.

Toughening agent 42 may be applied to material 38 in a variety of ways. For instance, toughening agent 42 may comprise a polymer. More specifically, in one embodiment, toughening agent 42 may comprise a polymer fiber that can be joined to the desired portion or portions of material 38 such that when an untoughened resin is later applied, as set forth herein below, a toughened resin is produced. Joining may include placing the fiber onto the material or weaving the fiber into the material (as shown in FIG. 3) in the desired location or locations, for example. In another embodiment, toughening agent 42 may comprise a polymer powder (as shown in FIG. 4) or polymer liquid that may be sprayed onto material 38 in the desired area or areas.

In the previously described embodiments, a toughened resin can be produced when an untoughened resin is later applied. The toughened resin can generally correspond to the portion or portions of the material comprising the polymer toughening agent. As used herein, "toughened resin" refers to resin that, when cured, displays a fracture toughness, or $K_{1C}$ (i.e. the material's resistance to fracture when a crack is already present), of at least about $1.0$ MPa-m$^{1/2}$.

Figure 5:
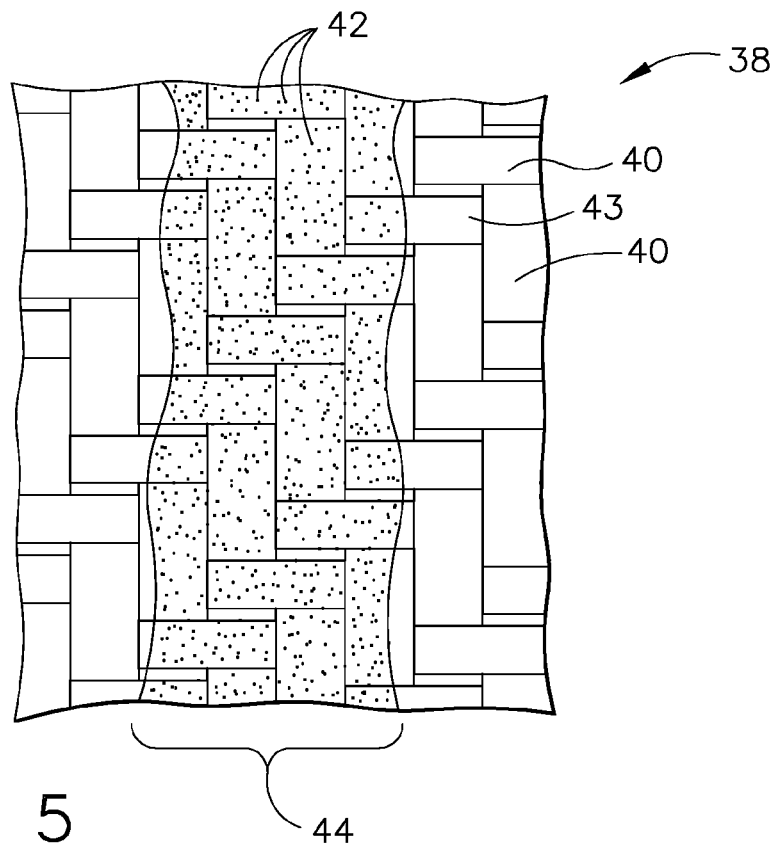
FIG. 5 is a schematic view of another alternate embodiment of a material having a toughening agent applied thereto in accordance with the description herein.

Alternately, as shown in FIG. 5, toughening agent 42 may comprise nano fibers such as nano carbon fibers, nano particles such as nano clay particles, and combinations thereof. Such toughening agents can be combined with an untoughened resin 43 gel, powder, or liquid, to make a toughened resin 44. Toughened resin 44 may then be applied to the desired portion or portions of material 38. As used herein "untoughened resin" refers to resin that, when cured, displays a fracture toughness, or $K_{1C}$, of less than about $1.0$ MPa-m$^{1/2}$. It is the addition of the toughening agent to the untoughened resin that, when cured, provides the toughened resin as defined herein. While the ratio of nano fibers/particles to resin may vary, in one embodiment the nano fibers/particles may account for from about 5% to about 20% by weight of the toughened resin, with the untoughened resin accounting for from about 80% to about 95% by weight.

In general, untoughened resin, when cured, can produce an untoughened region while toughened resin, when cured, can produce a toughened region, as defined herein below. While not intending to be limited by theory, it is believed that in the context of polymer toughening agents (whether fibers, powders, liquids or some combination thereof), when the untoughened resin is applied to the preform having the applied toughening agent, the untoughened resin can react with the previously applied polymer toughening agent to provide added fracture resistance to the cured composite material in the area generally corresponding to the portion of the material comprising the toughening agent. When using nano fibers/particles, it is believed that such toughening agents can enrich the resin and provide for a toughened region in the composite material after curing.

Figure 6:
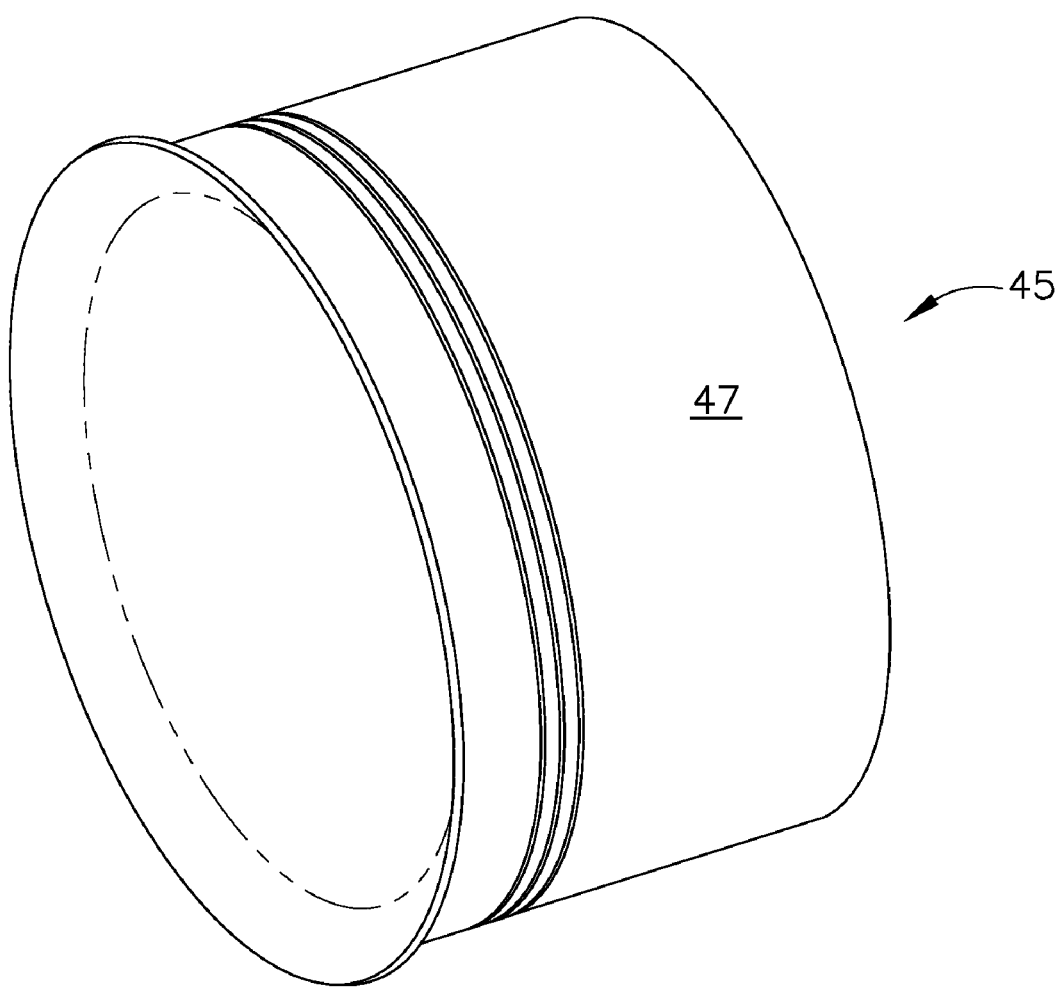
FIG. 6 is a schematic perspective view of one embodiment of a fan casing preform in accordance with the description herein.

Material 38 may be shaped to produce a preform of a desired article, which in one embodiment may comprise a fan casing preform 45. As shown in FIG. 6, fan casing preform 45 may comprise a body 47 having any form desired and may be fabricated using any tool known to those skilled in the art. See, for example, U.S. Patent Application No. 2006/0134251 to Blanton et al. While embodiments set forth herein generally describe application of the toughening agent followed by shaping of the material into a preform, those skilled in the art will understand that it is also acceptable for the material to first be shaped into the desired preform followed by application of the toughening agent.

An untoughened resin may then be applied to the entire preform. In one embodiment, the untoughened resin may comprise a resin selected from the group consisting of vinyl ester resins, polyester resins, acrylic resins, epoxy resins, polyurethane resins, bismaelimide resins, polyimide resins, and combinations thereof. The untoughened resin may be the same as, or different from, any untoughened resin previously used in combination with a toughening agent to produce the toughened resin. Any conventional resin application methods may be used herein to apply the untoughened resin to the preform.

Figure 7:
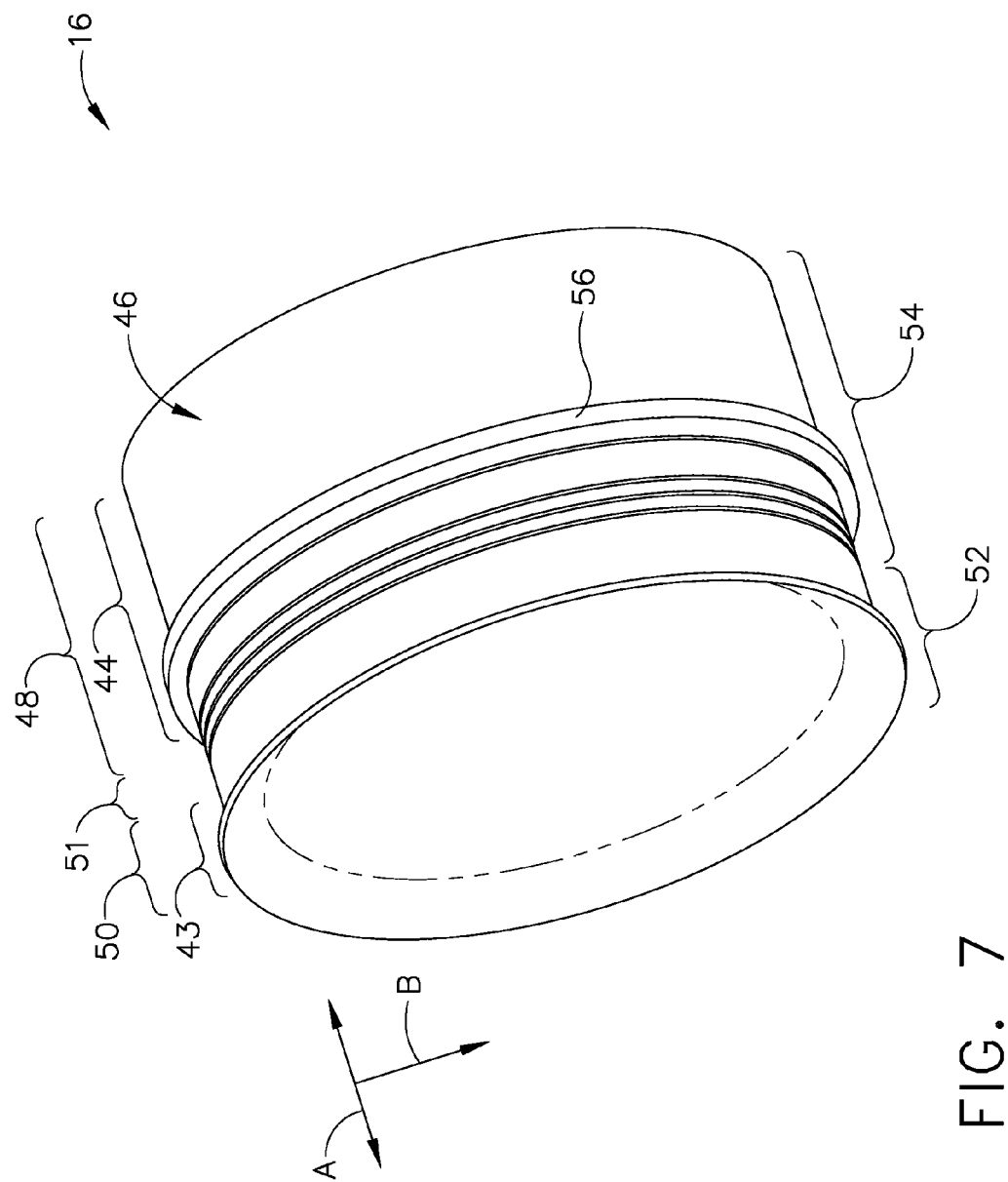
FIG. 7 is a schematic perspective view of one embodiment of a fan casing in accordance with the description herein.

The preform having the applied untoughened resin may then be cured to produce an article, such as fan casing 16, shown in FIG. 7. Curing can generally involve applying a resin to the material or preform, as previously described, followed by exposure of the resinated preform or material to high temperature and pressure. Any conventional curing process known to those skilled in the art is acceptable for use herein. Some examples of curing may include, but are not limited to, resin film infusion, resin transfer molding, and vacuum assist resin transfer molding.

As shown in FIG. 7, the resulting cured composite material 46 of fan casing 16 can have at least one toughened region 48, at least one untoughened region 50, and a transition region 51 between each toughened region 48 and untoughened region 50. As used herein, "untoughened region" 50 means an area of composite material 46 generally corresponding to the portion of the material comprising the untoughened resin 43. "Toughened region" 48 means an area of the composite material generally corresponding to the portion of the material comprising the toughened resin 44. Toughened region 48 can display an increased resistance to fracture when compared to untoughened region. Those skilled in the art will understand that toughened region 48 can generally correspond to portions of the material where the toughening agent was applied due to previously described interaction between the toughening agent and the untoughened resin. Toughened region 48 may be oriented in any in relation to fan casing 16.

Transition region 51 can generally be located between toughened region 48 and untoughened region 50 and can display varying degrees of toughness in order to facilitate the conversion between toughened region 48 and untoughened region 50. Moreover, those skilled in the art will understand that transition region 51 may be planar (as indicated by A in FIG. 7), normal to the plane (as indicated by B in FIG. 7), and combinations thereof, in relation to the fan casing, for example.

Additionally, in one embodiment shown in FIG. 7, fan casing 16 may comprise an impact zone 52 and a non-impact zone 54. "Impact zone" 52 refers to parts of fan casing 16 most susceptible to an impact from a released fan blade while "non-impact zone" 54 refers to parts of fan casing 16 that are less susceptible to impact damage from a released fan blade. It may be desirable to position untoughened region 50 in impact zone 52 to provide controlled resin microcracking and composite material ply delamination, both of which can facilitate the previously discussed dissipation of impact energy from a released fan blade. In contrast, it may be desirable to position toughened region 48 in a non-impact zone 54 as such areas can be more fracture resistant. Additionally, because toughened region 48 of fan casing 16 can have a reduced structural thickness compared to current fan casings, yet still provide the desired fracture resistance, fan casing 16 can have a reduced weight compared to current designs. Thus, exemplary embodiments may employ toughened and untoughened regions to provide controlled failure and weight reduction.

Additionally, the selective toughening concept described herein can also provide monetary savings. In general, toughened resins (i.e. those resins including toughening agents) are more costly than untoughened resins. However, to obtain the desired fracture resistance, multiple layers of composite material having untoughened resin must be used, which can increase the cost of fabricating the article. By using toughened resins only in select regions where increased fracture resistance is needed, and untoughened resin elsewhere, fewer layers of composite material are needed. This can lead to an overall cost savings in fabricating the article.

Optionally, at least one toughened flange 56 may be coupled to toughened region 48. Toughened flange 56 may be selected from the group consisting of mounting flanges, attachment end flanges (as shown in FIG. 7), and combinations thereof "Toughened flange" 56 refers to a flange that can be fabricated from the same, or similar, materials as toughened region 48 of fan casing 16. More specifically, toughened flange 56 can be made from a composite material having a toughening agent applied to at least a portion thereof, as described previously herein. In addition, toughened flange 56 may be coupled to a toughened region 48 of fan casing 16. By "coupled" it is meant that the toughened flange may be operably connected to the fan casing either after the lay-up of the fan casing preform is complete, or concurrent with the lay-up of the fan casing such that the toughened flange is an integral part of the finished cured fan casing. Using toughened materials to construct toughened flange 56 can provide added strength to both flange 56, as well as to the attachment between flange 56 and toughened region 48.

Those skilled in the art will understand that the previous description may apply equally to making any composite materials, and articles made from composite materials, and should not be limited to fan casings. Indeed, any gas turbine engine component constructed from composite materials may be fabricated using the methods and materials described herein. For example, the previous description may be used to fabricate a composite material airfoil having at least one toughened region and at least one untoughened region.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of making an article having at least one toughened region and at least one untoughened region comprising:
   providing a material;
   applying a toughening agent to a portion of the material;
   shaping the material to produce a preform;
   applying an untoughened resin to the preform; and
   curing the preform having the applied untoughened resin to produce the at least one toughened region and the at least one untoughened region wherein the toughened region comprises a toughened resin having a fracture toughness of at least about 1.0 MPa-m$^{1/2}$ wherein the article is a turbine engine component selected from the group consisting of fan casings and airfoils.

2. The method of claim 1 wherein the toughening agent is selected from the group consisting of polymers, nano fibers, nano particles, and combinations thereof.

3. The method of claim 1 wherein the material is selected from the group consisting of carbon fiber, glass fiber, ceramic fiber, graphite fiber, aramid fiber, and combinations thereof.

4. The method of claim 1 wherein the untoughened resin is a resin selected from the group consisting of vinyl ester resins, polyester resins, acrylic resins, epoxy resins, polyurethane resins, bismaleimide resins, polyimide resins, and combinations thereof.

5. The method of claim 1 wherein applying the toughening agent comprises joining the toughening agent to the material such that when the untoughened resin is applied the toughened resin is produced in the portion of the material comprising the toughening agent.

6. The method of claim 1 further comprising a transition region between each toughened region and untoughened region.

7. The method of claim 1 wherein the toughened region corresponds to the portion of the material comprising the toughening agent.

8. The method of claim 1 further comprising coupling at least one toughened flange to the at least one toughened region wherein the toughened flange is selected from the group consisting of mounting flanges, attachment end flanges, and combinations thereof.

9. The method of claim 1 wherein applying the toughening agent comprises spraying the toughening agent on the material such that when the untoughened resin is applied the toughened resin is produced in the portion of the material comprising the toughening agent.

10. The method of claim 1 wherein the untoughened region of the article comprises an impact zone.

11. The method of claim 1 wherein the toughened resin comprises from about 5% to about 20% by weight of the toughening agent.

12. A method of making an article having at least one toughened region and at least one untoughened region comprising:
   providing a material;
   shaping the material to produce a preform;
   combining a toughening agent with an untoughened resin to produce a toughened resin;
   applying the toughened resin to the preform; and
   curing the preform having the applied untoughened resin to produce the at least one toughened region and the at least one untoughened region
wherein the toughened region corresponds to the portion of the material comprising the toughened resin, the composite material comprises a transition region between each toughened region and untoughened region, and the toughened resin has a fracture toughness of at least about $1.0$ MPa-m$^{1/2}$ wherein the article is a turbine engine component selected from the group consisting of fan casings and airfoils.

13. The method of claim 12 wherein the toughening agent is selected from the group consisting of polymers, nano fibers, nano particles, and combinations thereof.

14. The method of claim 12 wherein each transition region is positioned in an orientation selected from the group consisting of planar, normal to the plane, and combinations thereof.

15. The method of claim 12 wherein the material is selected from the group consisting of carbon fiber, glass fiber, ceramic fiber, graphite fiber, aramid fiber, and combinations thereof.

16. The method of claim 12 further comprising coupling at least one toughened flange to the at least one toughened region wherein the toughened flange is selected from the group consisting of mounting flanges, attachment end flanges, and combinations thereof.

17. A method of making a fan casing having at least one toughened region and at least one untoughened region comprising:
   providing a material;
   applying a toughening agent to a portion of the material;
   shaping the material to produce a fan casing preform;
   applying an untoughened resin to the fan casing preform; and
   curing the fan casing preform having the applied untoughened resin to produce the at least one toughened region and the at least one untoughened region
wherein the toughened region corresponds to the portion of the material comprising the toughening agent and wherein the toughened region comprises a toughened resin having a fracture toughness of at least about $1.0$ MPa-m$^{1/2}$.

* * * * *